United States Patent
Koch et al.

(10) Patent No.: US 10,274,005 B2
(45) Date of Patent: Apr. 30, 2019

(54) INDUCTION-SOFTENED THERMOPLASTIC SHIMS

(71) Applicant: The Boeing Company, Chicago, IL (US)

(72) Inventors: William J. Koch, Bellevue, WA (US); Marc R. Matsen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 15/268,983

(22) Filed: Sep. 19, 2016

(65) Prior Publication Data
US 2018/0080495 A1    Mar. 22, 2018

(51) Int. Cl.
| | |
|---|---|
| *B29C 65/00* | (2006.01) |
| *F16B 43/00* | (2006.01) |
| *H05B 6/02* | (2006.01) |
| *F16B 5/02* | (2006.01) |
| *F16B 5/04* | (2006.01) |
| *F16B 11/00* | (2006.01) |

(52) U.S. Cl.
CPC ............ *F16B 43/00* (2013.01); *H05B 6/02* (2013.01); *F16B 5/02* (2013.01); *F16B 5/04* (2013.01); *F16B 11/006* (2013.01)

(58) Field of Classification Search
CPC .......... H05B 6/02; F16B 43/00; F16B 11/006; F16B 5/04; F16B 5/02
See application file for complete search history.

(56) References Cited

U.S. PATENT DOCUMENTS

| | | | |
|---|---|---|---|
| 5,660,669 A | * | 8/1997 | Mittleider ........... B29C 65/3668 156/272.4 |
| 5,935,475 A | | 8/1999 | Scoles et al. |
| 2014/0353305 A1 | | 12/2014 | Matsen et al. |
| 2015/0014304 A1 | * | 1/2015 | Matsen ............. B29C 66/73921 219/634 |

OTHER PUBLICATIONS

Author Unknown, TPX Characteristics, Goodfellow USA, http://www.goodfellowusa.com/larger-quantities/polymers/tpx-characteristics/, accessed Sep. 19, 2016, pp. 1-4.
Author Unknown, ThermoPlastics Properties Chart, FALCON® A Corning Brand, http://csmedia2.corning.com/LifeSciences/Media/pdf/an_DL_226_Falcon_ThermoPlastics_Broch.pdf, accessed Sep. 19, 2016, 1 page.

* cited by examiner

*Primary Examiner* — Jun S Yoo
(74) *Attorney, Agent, or Firm* — MH2 Technology Law Group LLP

(57) ABSTRACT

A shim assembly includes a shim material configured to be positioned between a first component and a second component. A wire is in contact with the shim material. The wire is configured to heat the shim material to above a predetermined temperature, and the shim material becomes moldable above the predetermined temperature such that the shim material is able to conform to the first component and the second component.

10 Claims, 5 Drawing Sheets

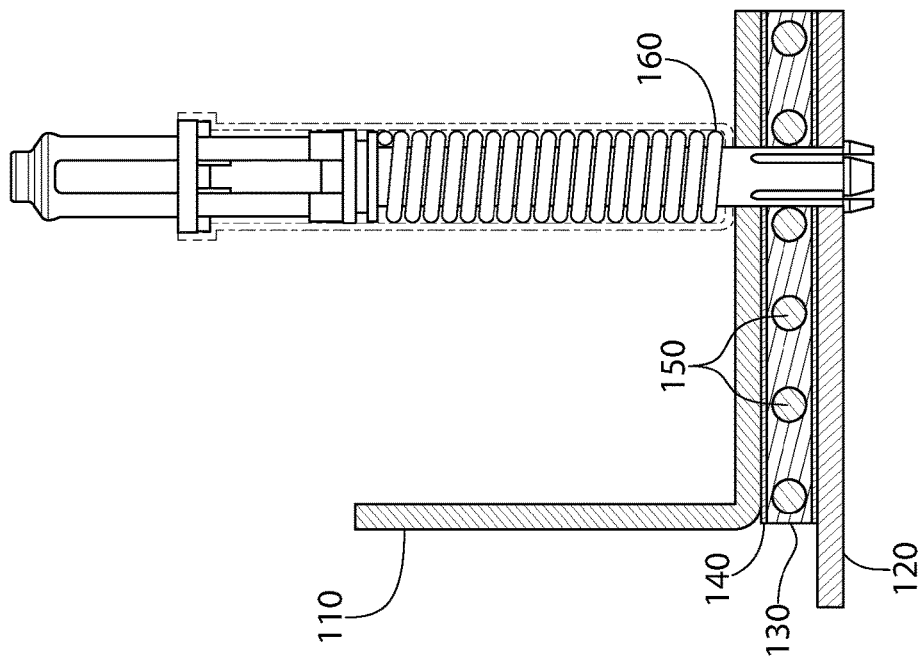
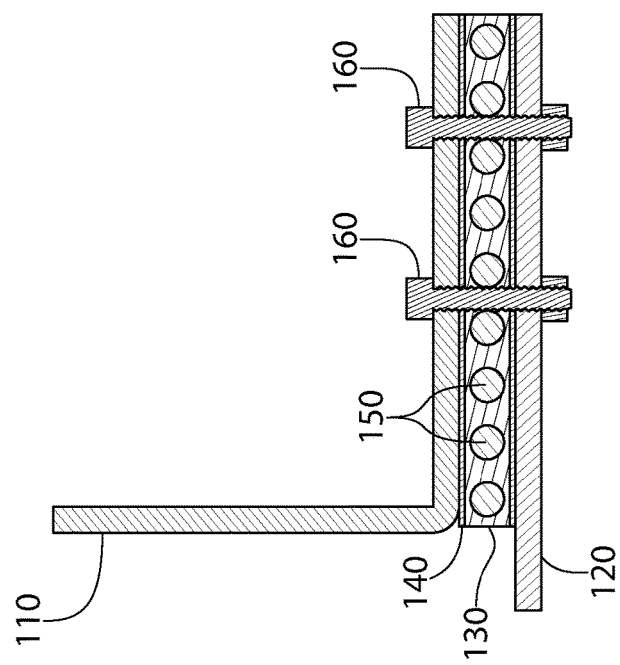
FIG. 1B
FIG. 1A

INDUCTION-SOFTENED THERMOPLASTIC SHIMS

TECHNICAL FIELD

The present teachings relate to the field of shims that fill voids between two components and, more particularly, to induction-softened thermoplastic shims.

BACKGROUND

The assembly of large structures may be hampered by dimensional mismatching, which may create a void at the interface between two components. This is especially problematic when one or more bag-side surfaces are at the interface. Shims are one common way to fill such voids. One common type of shim is the liquid shim, which includes an epoxy material. After the liquid shim is applied, the components are assembled with either temporary fasteners (e.g., clekos), or with the final fasteners partially torqued. Once the liquid shim sets (e.g., dries), the final fasteners are fully torqued. The liquid shim may take a day or more to set. What is needed is an improved shim that sets more quickly.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A shim assembly is disclosed. The shim assembly includes a shim material configured to be positioned between a first component and a second component. A wire is in contact with the shim material. The wire is configured to heat the shim material to above a predetermined temperature, and the shim material becomes moldable above the predetermined temperature such that the shim material is able to conform to the first component and the second component.

A method for assembling a first component and a second component is also disclosed. The method includes embedding a wire at least partially within a shim material. The shim material is then placed at least partially between the first and second components. The first and second components are then together using a first coupling device. An electrical current is then induced in the wire. The electrical current causes the wire to heat the shim material to above a predetermined temperature, and the shim material becomes moldable above the predetermined temperature such that the shim material is able to conform to the first component and the second component.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures:

FIG. 1A depicts a schematic view of two components having a shim material positioned therebetween.

FIG. 1B depicts a schematic view of the two components having the shim material positioned therebetween where the two components are coupled together with a cleko.

Figure 2:
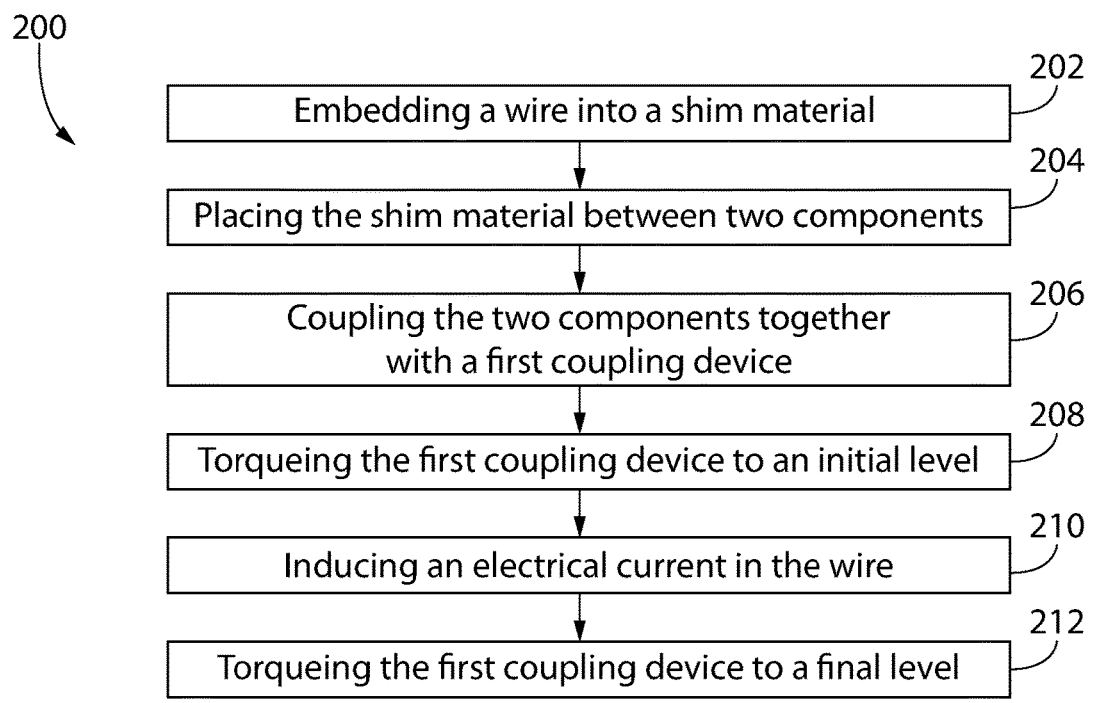
FIG. 2 depicts a flowchart of a method for assembling the two components.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings, which are illustrated in the accompanying drawings. Wherever possible, the same reference numbers will be used throughout the drawings to refer to the same or like parts.

The embodiments described herein provide an induction-softened thermoplastic shim. For example, FIG. 1A depicts a schematic view of two components 110, 120 having a shim material 130 positioned therebetween. In at least one embodiment, the components 110, 120 may be part of an aircraft, such as an airplane, a helicopter, an unmanned aerial vehicle ("UAV"), or the like. In one example, the first component 110 may be or include a rib, and the second component 120 may be or include wing skins to spars. The components 110, 120 may be made from a composite material or a metallic material. In one example, the composite material may be a carbon, fiberglass, or other fiber-reinforced plastic that cures at a temperature from about 300° F. to about 400° F. or about 325° F. to about 375° F. (e.g., about 350° F.). In another example, the metallic material may be titanium.

The components 110, 120 may have inconsistent tolerances such that the components 110, 120 may not be flush with one another when coupled together. In other words, one or more voids may be present between the components 110, 120 when the components 110, 120 are coupled together. In one example, the voids may be present in the bag-side surfaces of one or both of the components 110, 120.

The shim material 130 may be positioned between the two components 110, 120 and configured to fill the voids. The shim material 130 may be made from a polymer such as a fiber-reinforced plastic. More particularly, the shim material 130 may be made from a thermoplastic and/or epoxy material that softens and becomes pliable and/or moldable above a predetermined temperature and hardens/solidifies below the predetermined temperature. For example, the shim material 130 may be or include a polycarbonate material having a predetermined temperature from about 250° F. to about 320° F., about 265° F. to about 305° F., or about 280° F. to about 290° F. The predetermined temperature at which the shim material 130 becomes pliable and/or moldable may be less than the temperature at which the components 110, 120 cure.

One illustrative polycarbonate material that may be used is TARFLON®, which has a yield strength of up to 19 KSI and a mold temperature from about 150° F. to about 300° F. The polycarbonate material may also include flame-proof additives. In addition to polycarbonate materials, other plastics may also be used depending on the location, strength requirements, chemical resistance requirements, UV resistance, and the like. Such plastics may be or include acrylonitrile butadiene styrene ("ABS"), polyvinyl chloride ("PVC"), polystyrene ("PS"), poly(p-phenylene oxide) ("PPO"), poly(methyl methacrylate), polyethylene terephthalate ("PET"), polyamide, or the like.

In at least one embodiment, a mesh material 140 may be positioned at least partially within (e.g., embedded within) or around the shim material 130. The mesh material 140 may be or include fiberglass, carbon graphite, quartz, boron, other fiber materials, flame-retardants, or a combination there. The mesh material 140 may prevent the shim material 130 from extruding/creeping when compressed by the two components 110, 120.

One or more wires (one is shown: 150) may be in contact with the shim material 130. For example, the wire 150 may be positioned at least partially within (e.g., embedded within) the shim material 130. Together, the shim material 130, the mesh material 140, the wire 150, or a combination thereof may form a shim assembly that may be positioned between the components 110, 120.

In one embodiment, the wire 150 may be in a substantially serpentine (e.g., S-shaped) pattern in a single plane. In another embodiment, the wire 150 may be wrapped around the first component 110 or the second component 120 in a substantially helical pattern. The wire 150 may be or include an induction susceptor wire that is made from a ferromagnetic material. More particularly, the wire 150 may include iron, nickel, cobalt, manganese, chromium, or a combination thereof. For example, the wire 150 may include an alloy containing about 34 wt % nickel and about 66 wt % iron, which may have a smart leveling temperature from about 300° F. to about 340° F. The smart leveling temperature is the temperature where the wire 150 becomes substantially non-magnetic. This temperature is typically below the established Curie temperature of the wire 150. In another example, the wire 150 may include an alloy containing about 32 wt % nickel and about 68 wt % iron, which may have a smart leveling temperature from about 240° F. to about 300° F. The wire 150 may have a cross-sectional length (e.g., diameter) from about 50 micrometers (µm) to about 500 µm, about 100 µM to about 400 µM, or about 150 µM to about 350 µm.

The wire 150 may be configured to heat to a predetermined temperature (e.g., Curie temperature) when exposed to an electromagnetic field. The wire 150 may not be heated efficiently above the smart leveling temperature. The smart leveling temperature of the wire 150 may be greater than or equal to the temperature at which the shim material 130 becomes pliable and/or moldable and less than the temperature at which the components 110, 120 cure so as to not damage the components 110, 120. For example, the smart leveling temperature of the wire 150 may be from about 260° F. to about 340° F., about 275° F. to about 325° F., or about 290° F. to about 310° F.

Figure 3:
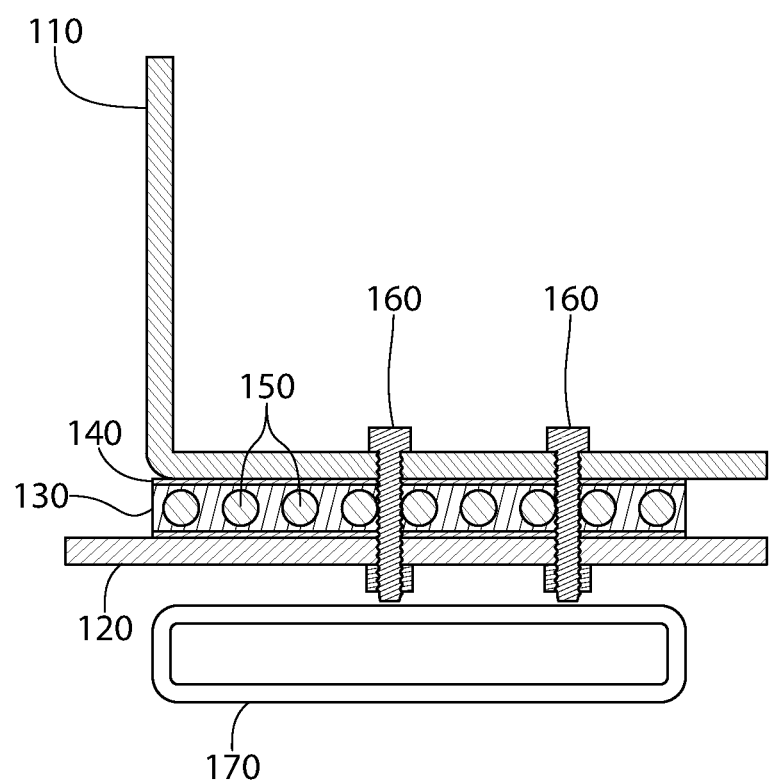
FIG. 3 depicts a schematic view of an induction coil positioned proximate to the shim material.
Figure 4:
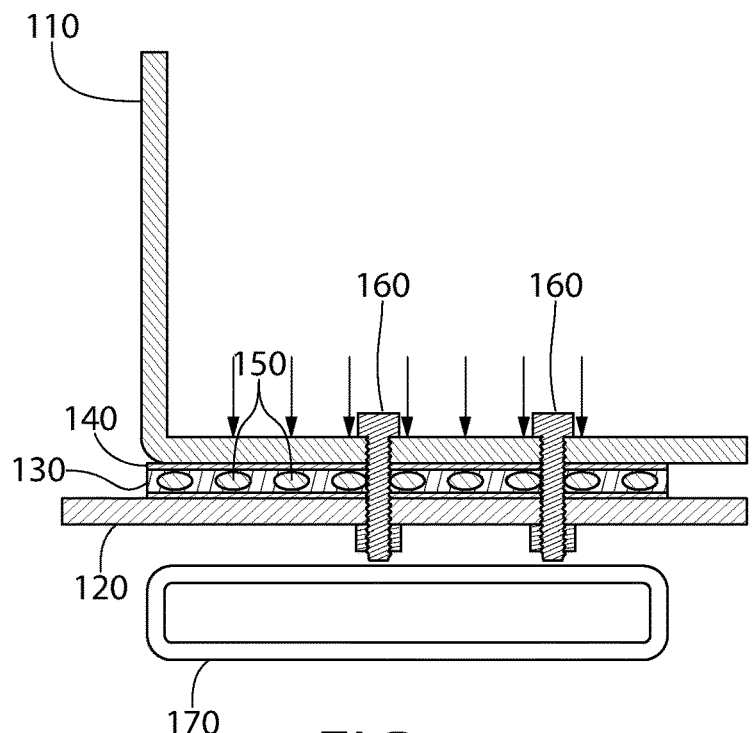
FIG. 4 depicts a schematic view of the shim material softening, allowing the two components to move closer together.

FIG. 2 depicts a flowchart of a method 200 for assembling first and second components 110, 120. Various stages of the method 200 are illustrated in FIGS. 1, 3, and 4. The method 200 may begin by embedding the wire 150 at least partially into the shim material 130, as at 202. This is shown in FIG. 1A. The method 200 may also include placing the shim material 130 (with the wire 150 embedded therein) between the two components 110, 120, as at 204. This is also shown in FIG. 1A.

The method 200 may also include coupling the two components 110, 120 together using one or more first coupling devices (two are shown: 160), as at 206. This is also shown in FIG. 1A. More particularly, the first coupling devices 160 may inserted into holes that are formed (e.g., drilled) through the first component 110, the second component 120, the shim material 130, the mesh material 140, the wire 150, or a combination thereof. The first coupling devices 160 may be or include a nut, a bolt, a screw, an adhesive, a band, a strap, or a combination thereof. In another embodiment, the first coupling device 160 may be or include a cleko, as shown in FIG. 1B.

The method 200 may also include torquing the first coupling devices 160 to an initial level, as at 208. The initial level may be less than a final torque level. This may provide a preloading.

Figure 5:
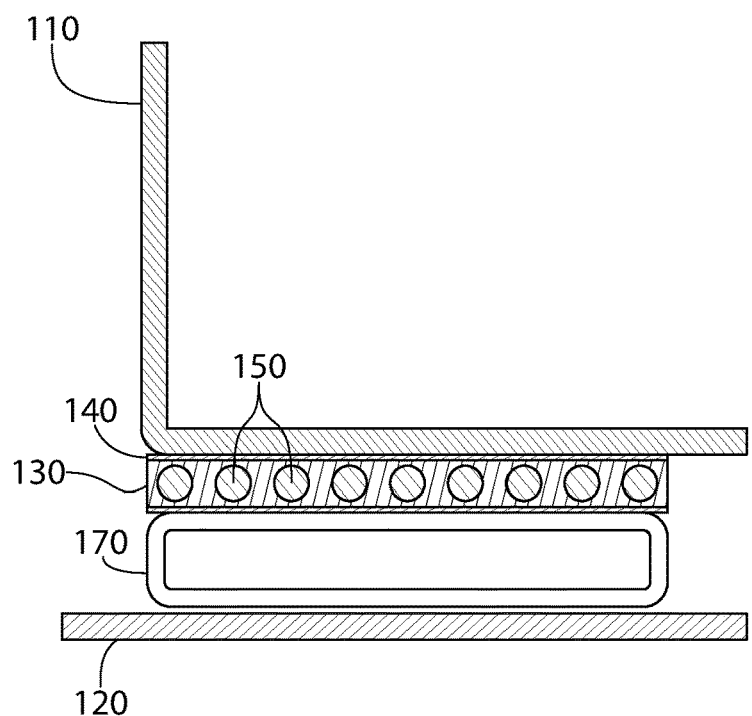
FIG. 5 depicts a schematic view of the induction coil positioned between the two components.

The method 200 may also include inducing an electrical current in the wire 150, as at 210. The electrical current may be induced when the shim material 130 (with the wire 150 embedded therein) is between the two components 110, 120, and the two components 110, 120 are coupled together. In at least one embodiment, the current may be induced by making the wire 150 part of a closed circuit (e.g., physically connecting an end of the wire 150 to a power source). In another embodiment, the current may be induced wirelessly. For example, an induction coil 170 may be positioned proximate to the wire 150. This is shown in FIG. 3. When the induction coil 170 is positioned external to the composite material (e.g., the first component 110 and/or the second component 120), as shown in FIG. 3, the induction coil 170 may be supplied with an alternating current ("AC") having a frequency from about 10 kHz to about 30 kHz or about 15 kHz to about 25 kHz to avoid unwanted heating of the components 110, 120. When the induction coil 170 is positioned internal to the composite material (e.g., the first component 110 and/or the second component 120), as shown in FIG. 5, the induction coil 170 may be supplied with an alternating current having a frequency from about 80 kHz to about 500 kHz or about 150 kHz to about 300 kHz because the field does not need to penetrate the composite material to heat the wire 150. In response to the current, the induction coil 170 may generate an electromagnetic field. The electromagnetic field may be substantially parallel to a central longitudinal axis through the wire 150. In another embodiment, the electromagnetic field may be substantially perpendicular to the central longitudinal axis through the wire 150.

The electromagnetic field may cause the wire 150 to increase in temperature. More particularly, the wire 150 may increase in temperature until the wire 150 reaches the smart leveling temperature, at which point the temperature of the wire 150 may remain substantially constant at the smart leveling temperature as long as the electromagnetic field is present. The heat generated by the wire 150 may be transferred to the surrounding shim material 130. As discussed above, when the shim material 130 reaches the predetermined temperature, the shim material 130 softens and becomes pliable and/or moldable. When the shim material 130 softens and becomes pliable and/or moldable, the preloading (discussed above) may cause the shim material 130 to fill the void(s) by conforming to the surfaces of the components 110, 120.

The method 200 may also include torquing the first coupling devices 160 to a final level that is greater than the initial level, as at 212. This is shown in FIG. 4. In at least one embodiment, the first coupling devices 160 may be torqued to the final level when the shim material 130 is above the predetermined temperature. In another embodiment, the first coupling devices 160 may be torqued to the final level once the current is no longer induced (e.g., a few minutes after the current is reduced or cut off) and the shim material 130 falls back below the predetermined temperature. In at least one embodiment, rather than torquing the first coupling devices 160 to the final level, the first coupling devices 160 may be removed, and one or more second coupling devices may be inserted and torqued to the final level.

Once the method 200 is complete, the induction coil 170 may be moved away from the components 110, 120, the shim material 130, and the wire 140. The wire 140, however, may remain positioned within the shim material 130 and between the components 110, 120.

FIG. 5 depicts a schematic view of the induction coil 170 positioned between the two components 110, 120. The induction coil 170 may be coupled to or integral with the shim material 130 and/or the wire 140. In at least one embodiment, the wire 140 and/or the induction coil 170 may remain positioned between the two components 110, 120 as the two components 110, 120 are moved closer together (as in step 210 above). In another embodiment, the wire 140 and/or the induction coil 170 may be removed from between the two components 110, 120 before the two components 110, 120 are moved closer together (as in step 210 above).

Figure 6:
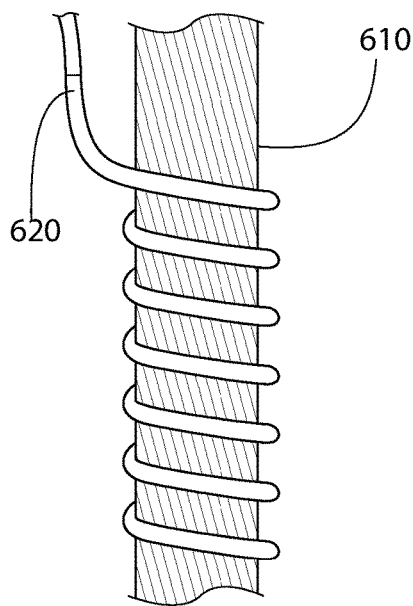
FIG. 6 depicts a side view of a first wire having a second wire wrapped helically around it.
Figure 7:
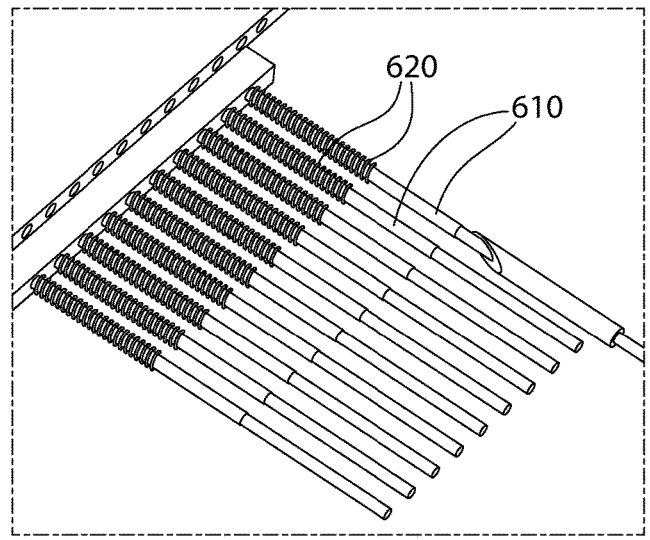
FIG. 7 depicts a perspective view of a plurality of the first wires substantially parallel to one another where each of the first wires has a second wire wrapped helically around it.

FIG. 6 depicts a side view of a first wire 610 having a second wire 620 wrapped helically around it, and FIG. 7 depicts a perspective view of a plurality of the first wires 610 substantially parallel to one another where each of the first wires 610 has a second wire 620 wrapped helically around it. The first wire 610 may be or include a copper wire (e.g., Litz wire) having a plurality of strands. The first wire 610 may serve as the induction coil 170 described above. The first wire 610 may provide low electrical resistance at high frequencies. When electrical current flows through the first wire 610, a magnetic field is generated that is parallel to the axis of the first wire 610.

The second wire 620 may be or include a smart susceptor wire, similar to the wire 150 described above. The first wire 610 with the second wire 620 wrapped therearound may form a heater ribbon. The heater ribbon may use a continuous electrical path despite holes in the heater ribbon. Thus, the first wires 610 may be diverted around the holes in the heater ribbon. The first and second wires 610, 620 may be encased in a high-temperature layer to create a heater strip of known thickness.

Figure 8:
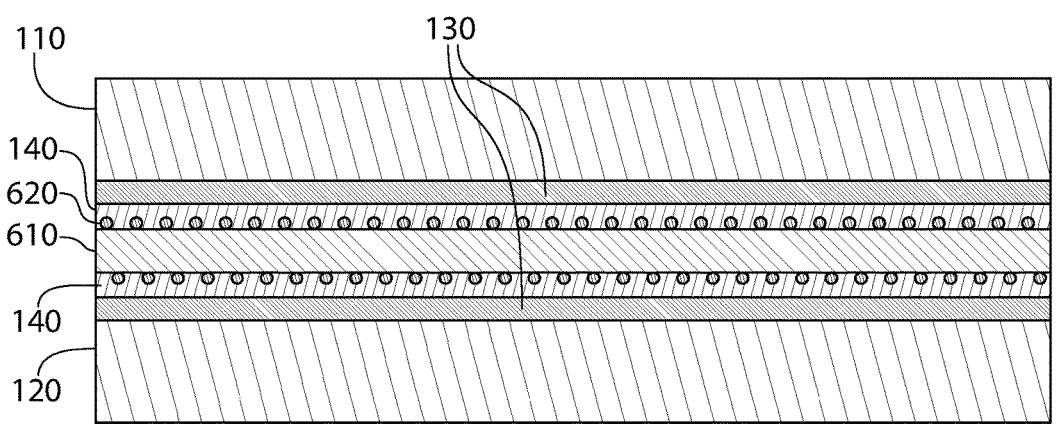
FIG. 8 depicts a side cross-sectional view of the wires from FIG. 7 positioned between two layers of the shim material.

FIG. 8 depicts a side cross-sectional view of the wires 610, 620 from FIG. 7. The wires 610 and/or 620 may be embedded within a material 140, which may be another polymer material with a melting temperature that is higher than the shim material 130. The material 140 with the wires 610, 620 therein may be placed between two layers of the shim material 130. The shim material 130 may then be placed between the two components 110, 120. The magnetic field generated by the first wires 610 may inductively heat the second wires 620, which may cause the shim material 130 to soften. As described above, when the shim material 130 softens and becomes pliable and/or moldable, the preloading may cause the shim material 130 to fill the void(s) by conforming to the surfaces of the components 110, 120. In at least one embodiment, the first and second wires 610, 620 and the material 140 may be removed after the shim material 130 fills the voids.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A method for assembling a first component and a second component, comprising:
    embedding a wire at least partially within a shim material;
    placing the shim material at least partially between the first and second components;
    inserting a first coupling device into aligned holes formed in the first component, the second component, and the shim material;
    mechanically coupling the first and second components together using the first coupling device; and
    inducing an electrical current in the wire, wherein the electrical current causes the wire to heat the shim material to above a predetermined temperature, wherein the shim material becomes moldable above the predetermined temperature such that the shim material is able to conform to the first component and the second component while the first and second components are mechanically coupled together.

2. The method of claim 1, wherein the electrical current is induced using an induction coil.

3. The method of claim 2, wherein the induction coil is positioned on an opposing side of the first component or the second component from the shim material.

4. The method of claim 2, wherein the induction coil is positioned between the first and second components.

5. The method of claim 2, wherein the induction coil is coupled to or integral with the wire.

6. The method of claim 1, further comprising torquing the first coupling device to an initial level before inducing the electrical current.

7. The method of claim 6, further comprising torquing the first coupling device to a final level after the shim material exceeds the predetermined temperature.

8. The method of claim 7, wherein the first coupling device is torqued to the final level when the shim material is above the predetermined temperature.

9. The method of claim 7, wherein the first coupling device is torqued to the final level after the shim material cools to below the predetermined temperature.

10. The method of claim 6, further comprising:
   removing the first coupling device after the shim material exceeds the predetermined temperature; and
   inserting and torquing a second coupling device to a final level that is greater than the initial level.

\* \* \* \* \*